(12) United States Patent
Na

(10) Patent No.: US 8,437,585 B2
(45) Date of Patent: May 7, 2013

(54) LOW-COST PASSIVE OPTICAL WAVEGUIDE USING SI SUBSTRATE

(75) Inventor: Yun-Chung N. Na, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 197 days.

(21) Appl. No.: 12/962,223

(22) Filed: Dec. 7, 2010

(65) Prior Publication Data

US 2012/0138568 A1 Jun. 7, 2012

(51) Int. Cl.
| | |
|---|---|
| *G02B 6/10* | (2006.01) |
| *G02B 6/12* | (2006.01) |
| *G02B 6/30* | (2006.01) |
| *H01L 21/302* | (2006.01) |
| *B29D 11/00* | (2006.01) |
| *B32B 38/06* | (2006.01) |
| *B32B 38/10* | (2006.01) |

(52) U.S. Cl.
USPC .................. 385/14; 385/49; 216/24; 216/79; 257/E21.214

(58) Field of Classification Search .............. 385/13, 385/129, 141, 147, 2, 3, 14, 49, 88; 216/24, 216/79; 257/52, 189, 458, E21.09, E29.003, 257/E31.061
See application file for complete search history.

(56) References Cited

U.S. PATENT DOCUMENTS

| | | | | |
|---|---|---|---|---|
| 6,358,839 | B1* | 3/2002 | Li et al. | 438/624 |
| 7,120,336 | B2* | 10/2006 | Sandhu et al. | 385/39 |
| 7,373,052 | B2* | 5/2008 | Nadeau et al. | 385/50 |
| 7,738,753 | B2* | 6/2010 | Assefa et al. | 385/49 |
| 8,319,237 | B2* | 11/2012 | Liu | 257/98 |
| 2007/0258680 | A1* | 11/2007 | Nadeau et al. | 385/30 |
| 2007/0274630 | A1* | 11/2007 | Ghiron et al. | 385/33 |
| 2010/0295128 | A1* | 11/2010 | Daghighi | 257/347 |
| 2011/0084047 | A1* | 4/2011 | Yeo et al. | 216/24 |

OTHER PUBLICATIONS

Sherwood-Droz, Nicolas et al., "Oxidized Silicon-On-Insulator (OxSOI) from bulk silicon: a new photonic platform", Optics Express, vol. 18, No. 6, Mar. 15, 2010, pp. 5785-5790.

* cited by examiner

*Primary Examiner* — Akm Enayet Ullah

(74) *Attorney, Agent, or Firm* — Kevin A. Reif

(57) ABSTRACT

A passive optical waveguide is solely built on a Si substrate while still maintaining high optical quality. Two side-by-side diamond shaped cavities may be etched into the Si wafer and oxide grown on the inner walls of the cavities until the oxide meets at opposing inner vertices of the diamond shaped cavities. An optical waveguide is formed by the inverted, generally triangular cross-sectional, portion of silicon remaining between the top surface of the wafer and the opposing inner vertices.

12 Claims, 3 Drawing Sheets

US 8,437,585 B2

LOW-COST PASSIVE OPTICAL WAVEGUIDE USING SI SUBSTRATE

FIELD OF THE INVENTION

Embodiments of the present invention are directed to optical waveguides and, more particularly, to optical waveguides fabricated on a Silicon (Si) substrate.

BACKGROUND INFORMATION

High-bandwidth, power efficient, and reliable optical links have potential to change the consumer electronics and server markets as internet data traffic continues to grow exponentially over the years and electronic interconnects are reaching their limits to sustain such growth. Integrated optoelectronic technology can serve as critical enabler to allow personal computing devices to send and receive data at unprecedented rate. In recent years, many successes in optical-component research in the field of silicon photonics have made silicon-on-insulator (SOI) a promising material for the future generations of integrated optoelectronic systems. A typical integrated optoelectronic system could include lasers, modulators, multiplexers/demultiplexers, photo-detectors, and other passive components such as filters, couplers and waveguides.

Silicon Photonics relies largely on the use of SOI wafers to create passive optical waveguides. A silicon on insulator (SOI) wafer may comprise a silicon substrate having a buried oxide (BOX) layer and a silicon handle layer on the BOX layer. While an SOI based waveguide provides a strong confinement of optical field and the ease of integration with other optical/electrical components, it may not be without tradeoffs.

First, the cost of SOI process may be substantially larger than a simpler Si process, including both substrate and fabrication expenses. For this reason, a majority of leading foundries have never stepped into SOI market. Second, the buried oxide in SOI tends to block excess heat flow that is inevitably generated by the optical/electrical components, and therefore may feature poor thermal conductivity and stability.

BRIEF DESCRIPTION OF THE DRAWINGS

The foregoing and a better understanding of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

DETAILED DESCRIPTION

Described is a passive optical waveguide, which is solely built on a Si substrate while still maintaining high optical quality. It is also suitable for the integration with a variety of active components including, for example, hybrid lasers, modulators, and photodetectors, and therefore enables a new solution to low-cost, high-quality Silicon Photonics.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
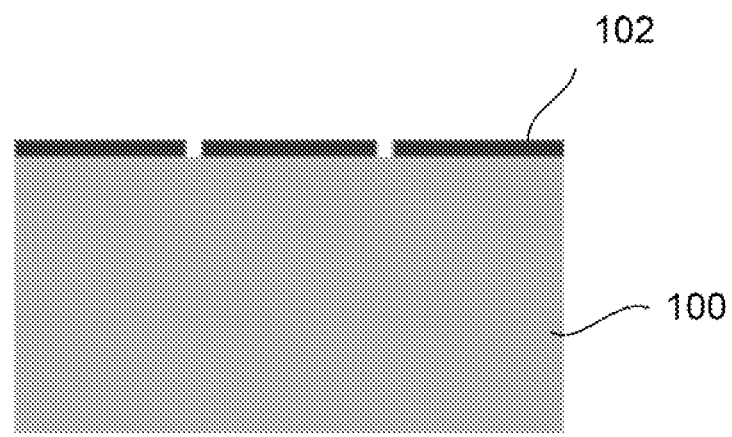
FIG. 1 is a cross-sectional view of a standard (100) silicon (Si) wafer with a patterned mask.

Referring now to FIG. 1, there is shown a cross-sectional view of a Si wafer 100 having a (100) orientation. Mask layer 102, which may be, for example a hard mask nitride layer, may be deposited on the Si wafer 100 and patterned.

Figure 2:
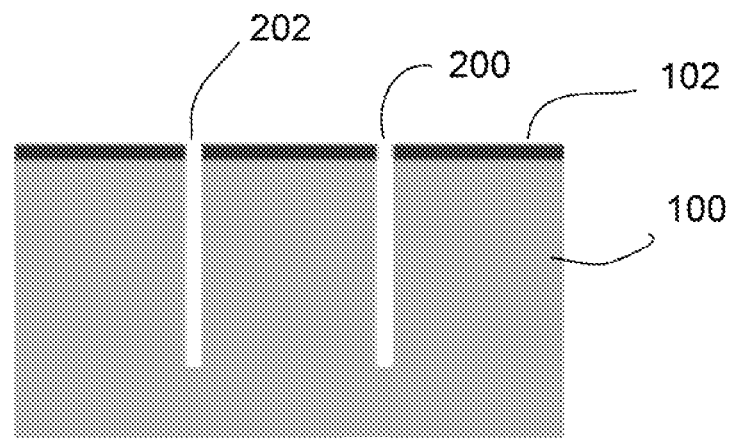
FIG. 2 is a cross-sectional view of the Si wafer having two trenches defining lateral boundaries for a waveguide.

As shown in FIG. 2, the wafer 100 with mask 102 may be etched to form two trenches 200 and 202. The trenches may be etched with any suitable etching process. In one embodiment the trenches 200 and 202 may be formed with a dry etch process, such as reactive ion etching. The two trenches 200 and 202 may define the lateral boundaries of the final waveguide. The width and depth of the trenches 200 and 202 may be chosen dependent on the desired design parameters of the final waveguide geometry. For example, the trenches 200 and 202 may have a width of 100 nm and a depth of 1 nm.

Figure 3:
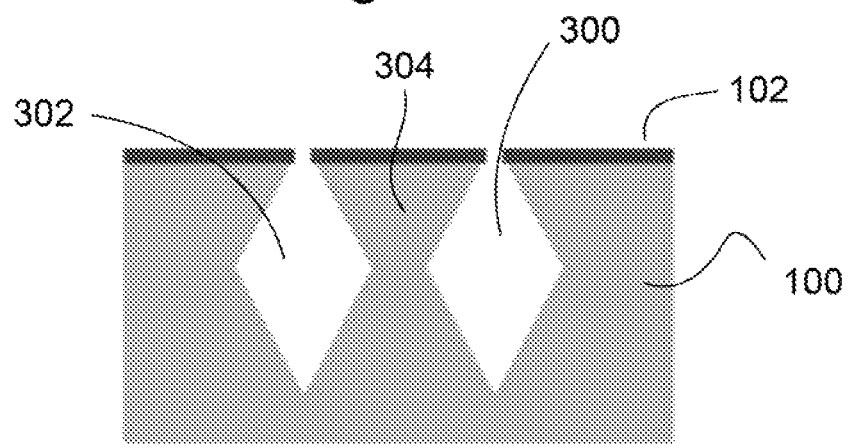
FIG. 3 is a cross-sectional view of a the Si wafer after wet etching to open two generally diamond-shaped cavities.

Referring now to FIG. 3, the two trenches 200 and 202 may be then exposed to crystallographic etchant such as, for example, KOH (potassium hydroxide), EDP (ethylene diamene pyrocatechol), TMAH (tetramethyl ammonium hydroxide), or $_NH_4OH$ (ammonium hydroxide).

This wet etch process will create two diamond-like openings, 300 and 302, with an Si neck piece 304 remaining in-between. The openings or cavities 300 and 302 may comprise a ~54.7° angle with respect to normal. The exact shape depends on the initial trench width & depth, as well as the wet-etch rate and duration.

Figure 4:
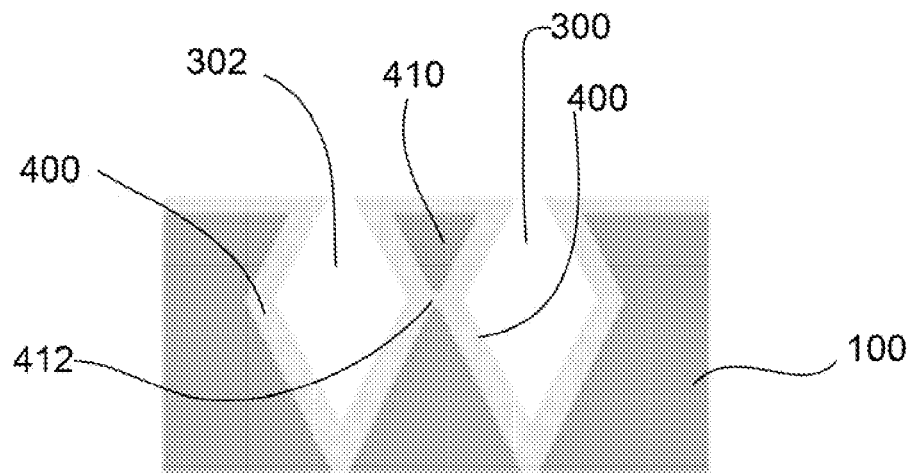
FIG. 4 is a cross-sectional view of the Si wafer having oxide grown on the inner walls of the diamond shaped trench until a "neck" is formed connecting the trenches.

As shown in FIG. 4, a layer of silicon oxide 400 may be grown, such as by thermal oxide growth, on the inner walls of the diamond shaped openings 300 and 302. As shown, the oxide 400 may be grown thick enough that that it converges at the opposing inner vertices 412 of the diamond shaped openings 300 and 302, creating an inverted triangular section of Si 410. This inverted triangular section comprises the Si waveguide 410 according to one embodiment of the invention. Of course, the apex of the triangle may not be at a perfect point, thus the shape of the inverted triangular Si waveguide may be considered generally inverted triangular or inverted trapezoidal waveguide dubbed ITWG. The Si ITWG 410 being enclosed by surrounding oxide 400 enables guiding of light by Total Internal Reflection (TIR).

Figure 5:
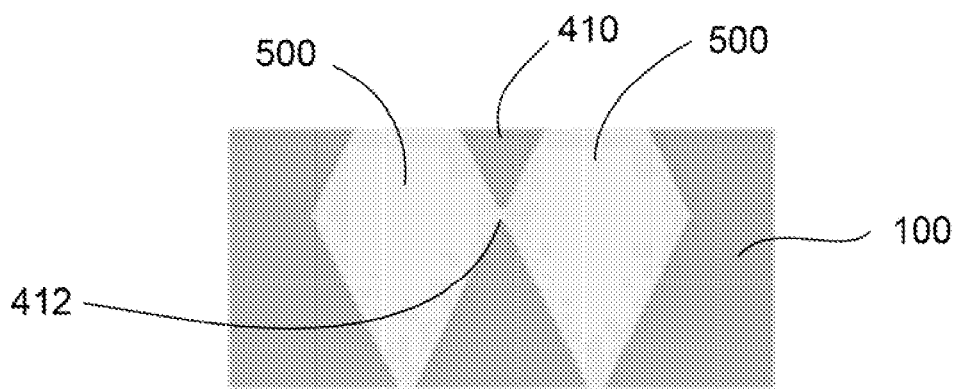
FIG. 5 is a cross-sectional view of the Si wafer having an Si waveguide formed above the neck between the outer walls of the diamond shaped trenches.

As shown in FIG. 5, the wafer 100 may thereafter be replanarized, such as by depositing and then reflow an oxide (or polymer) material 500 to fill the diamond holes.

Because the IT waveguide 410 sidewalls are created by wet-etching a re-entrant (111) Si crystal plane, ultra-smoothness is expected. Unlike the popular rib/ridge SOI waveguide where sidewalls are defined by dry etch that induces surface roughness, the IT waveguide 410 according to embodiments of the invention feature negligible scattering loss compared to even the best passive optical waveguide that exists in the literature.

Figure 6:
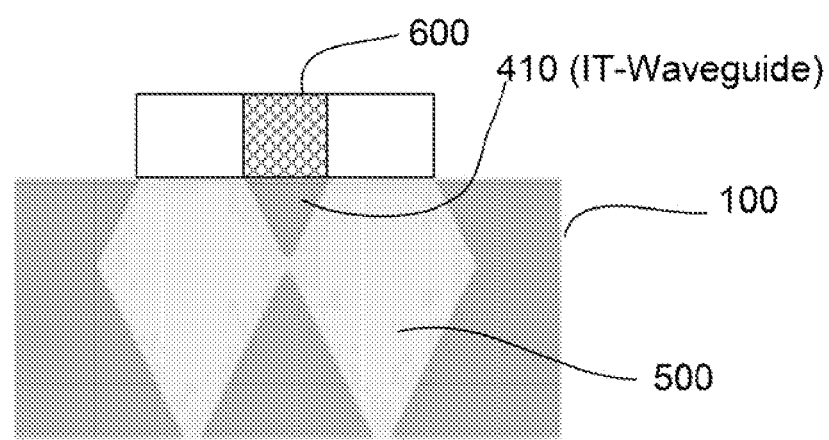
FIG. 6 is a cross-sectional view of the Si wafer including an inverted triangular (or trapezoidal) (IT) waveguide having an optical or optoelectronic device thereon.

From the integration point of view, the IT waveguide 410 may provide advantages for many applications. First, as shown in FIG. 6, an optic or optoelectronic device 600 may be provided on top of the waveguide 410. The device 600 may be, for example, a hybrid laser, which is an active layer (e.g. InP wafer) bonded directly on top of waveguide 410. This may allow a cost effective solution as well as a better thermal sink compared to current SOI waveguide architecture.

Second, the device 600 may comprise an electroabsorption modulator (e.g. SiGe Franz-Keldysh effect) built on the proposed device. The device 600 may also comprise a waveguide photodetector (e.g. Ge direct band-gap absorption) also built on the proposed device. Minimum modifications on the existing process flows of these two devices are expected. Finally, the device 600 may comprise optoelectronics integrated with IC components (e.g. drivers and amplifiers) formed on a single Si wafer 100. Additional changes on the IC fabrication due to the buried oxide in SOI wafers are not necessary according to some embodiments.

Figure 7:
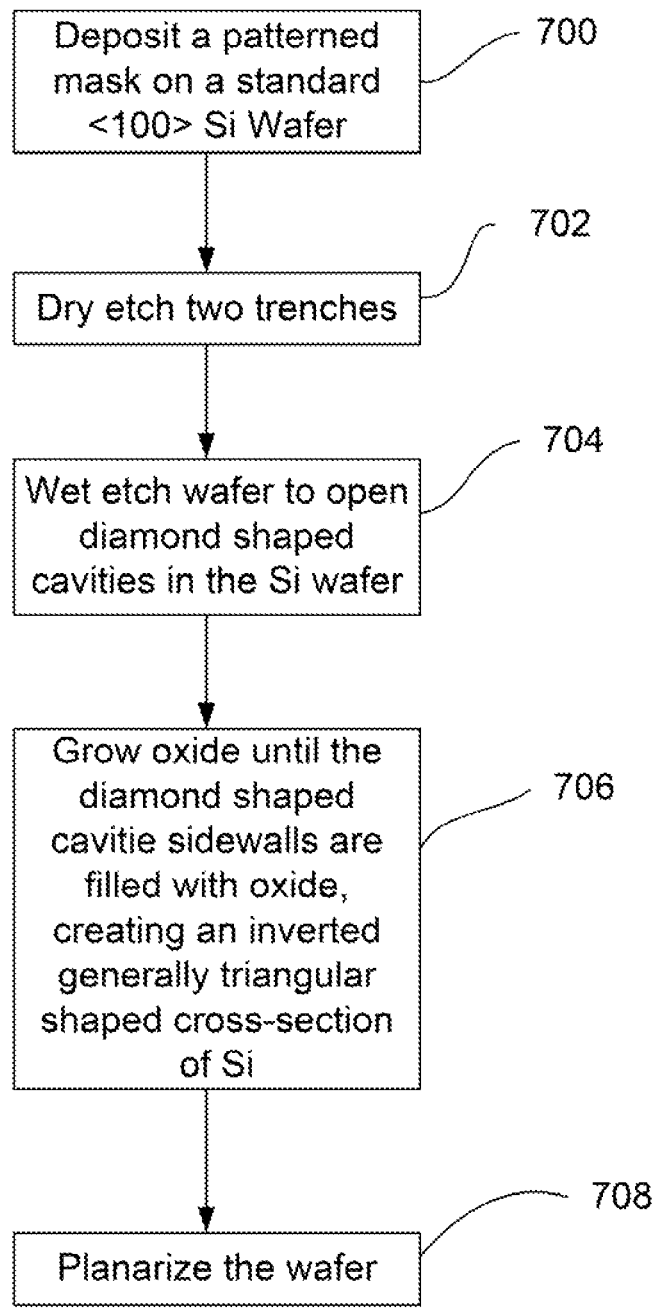
FIG. 7 is a flow diagram for forming a Si IT waveguide according to one embodiment.

FIG. 7 shows a flow diagram for forming a Si IT waveguide according to one embodiment. In box 700, the process may start with a standard (100) Si wafer. A hard mask (e.g. nitride layer) may then be deposited and patterned on the wafer surface.

In box 702, two side-by-side trenches may be dry-etched (e.g. reactive ion etch) to define waveguide lateral boundaries. The width and depth of the two trenches depends on the designed final IT waveguide geometry. In box 704, the wafer may then be immersed, for example, in a crystallographic etchant (e.g. NH4OH), which opens up two side-by-side diamond-like shaped cavities with a ~54.7° angle with respect to normal. The exact shape depends on the initial trench width & depth, as well as the wet-etch rate & duration.

In box 706, a thermal oxide may be grown on the Si wafer surface and in the cavities until the "neck" of the Si piece sandwiched in-between the two diamond shaped cavities is filled with oxide. The mask may be first removed if desired. The IT waveguide 410 is now formed as shown in the cross-section view, for example of FIG. 6. Thereafter devices that utilize the waveguide may be fabricated or placed in the wafer.

Waveguide bend may also be made by adopting similar process flow. However, the mask shape may be re-designed instead of a simple curve because the crystallographic wet-etch attacks the (111) Si plane, which may results into a zigzag shape (top view) along a non-straight waveguide.

According to embodiments, a low-cost, high-quality Si waveguide is provided which could potentially replace the existing SOI waveguides. In addition, the thermal stability of any active components build on the invention is expected to be superior, simply because the Si wafer is an efficient heat sink compared to SOI wafers. In addition, using Si wafers is generally preferred for high-volume manufacture because the majorities of leading foundries that can provide sufficient volumes for consumer electronics process Si wafers and generally do not process SOI wafers because of the additional cost of SOI wafer and processing.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a silicon wafer having a top surface, a cross-section of the silicon wafer comprising:
   two generally diamond shaped trenches;
   an oxide layer in the two generally diamond shaped trenches, the oxide layer converging at inner vertices of the diamond shaped trenches;
   a waveguide comprising an inverted generally triangular section of silicon between the top surface of the silicon wafer and the inner vertices of the diamond shaped trenches.

2. The apparatus as recited in claim 1 wherein the top surface of the silicon wafer comprises a (100) crystal orientation.

3. The apparatus as recited in claim 1 wherein inner walls of the diamond shaped trenches comprise a (111) crystal orientation.

4. The apparatus as recited in claim 1 wherein the inner walls of the diamond shaped trenches comprise a ~54.7° angle with respect to normal.

5. The apparatus as recited in claim 1 further comprising an optical device on the top surface over the waveguide.

6. The apparatus as recited in claim 5 wherein the optical device is a laser.

7. The apparatus as recited in claim 5 wherein the optical device is a photodiode.

8. The apparatus as recited in claim 5 wherein the optical device is an electroabsorption modulator.

9. A system, comprising:
   a silicon wafer having a top surface, a cross-section of the silicon wafer comprising:
   two generally diamond shaped trenches;
   an oxide layer in the two generally diamond shaped trenches, the oxide layer converging at inner vertices of the diamond shaped trenches;
   a waveguide comprising an inverted generally triangular section of silicon between the top surface of the silicon wafer and the inner vertices of the diamond shaped trenches; and
   an optical or optoelectronic device over the waveguide.

10. The system as recited in claim 9 wherein the device comprises a laser.

11. The system as recited in claim 9 wherein the device comprises a photodetector.

12. The system as recited in claim 9 wherein the device comprises an electroabsorption modulator.

* * * * *

UNITED STATES PATENT AND TRADEMARK OFFICE
CERTIFICATE OF CORRECTION

PATENT NO. : 8,437,585 B2  
APPLICATION NO. : 12/962223  
DATED : May 7, 2013  
INVENTOR(S) : Yun-Chung N. Na Page 1 of 1

It is certified that error appears in the above-identified patent and that said Letters Patent is hereby corrected as shown below:

Please insert:

In column 1, line 3, before FIELD OF THE INVENTION,

--STATEMENT OF GOVERNMENT INTEREST

This invention was made with Government support under contract number H98230-08-3-0011 awarded by the Department of Defense. The Government has certain rights in this invention.--

Signed and Sealed this
Twenty-fourth Day of May, 2016

Michelle K. Lee
*Director of the United States Patent and Trademark Office*